Sept. 15, 1964
G. A. LINDSEY
3,148,661
TEAT CUP FOR MILKING MACHINES
Filed Sept. 10, 1962
2 Sheets-Sheet 1
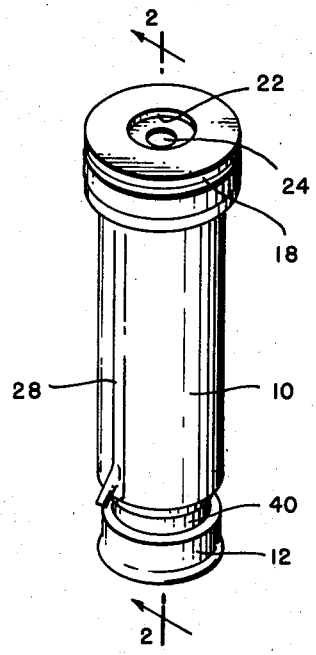
FIG. 1
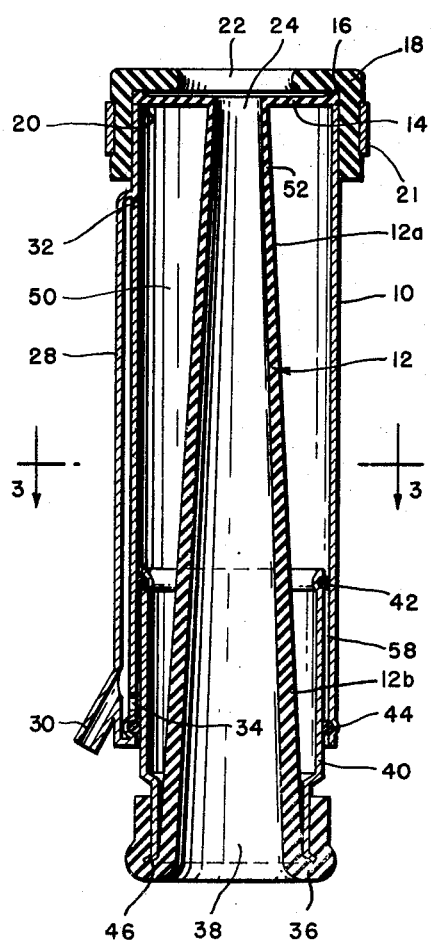
FIG. 2
FIG. 3
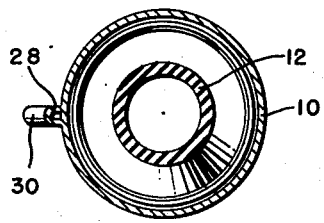
GEORGE A. LINDSEY
INVENTOR.
BY *Clarence M. Tuck*
ATTORNEY Sept. 15, 1964  G. A. LINDSEY  3,148,661
TEAT CUP FOR MILKING MACHINES
Filed Sept. 10, 1962  2 Sheets-Sheet 2
FIG. 4
FIG. 5
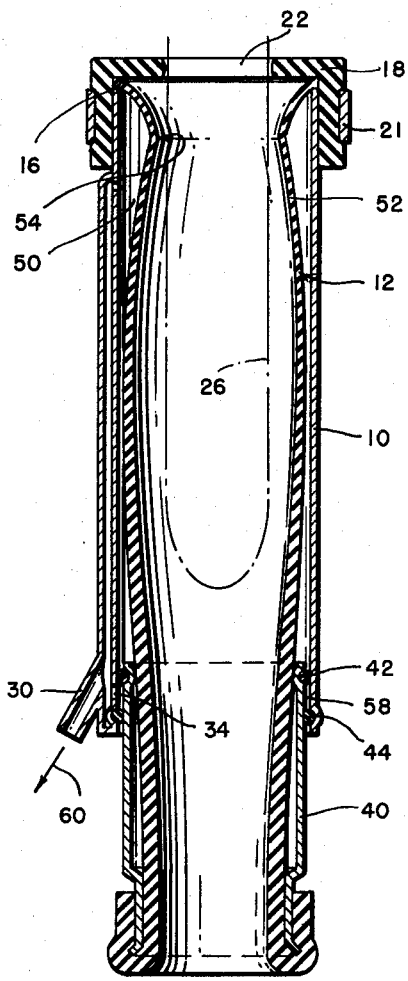
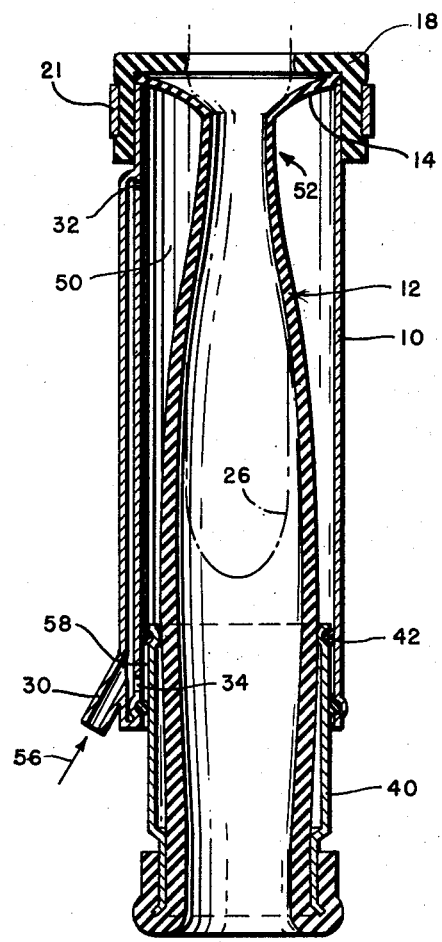
GEORGE A. LINDSEY
INVENTOR.
BY *Clarence M. Tuck*
ATTORNEY United States Patent Office 3,148,661
Patented Sept. 15, 1964

3,148,661
TEAT CUP FOR MILKING MACHINES
George A. Lindsey, Rte. 2, Arlington, Wash.
Filed Sept. 10, 1962, Ser. No. 222,373
5 Claims. (Cl. 119—14.5)

This present invention relates to the general field of pulsating milking machines of the type where a tube-like cup arrangement is secured on the various teats of the udder of a cow, and more particularly this invention relates to a teat cup which has a novel liner designed so that it will be opened from the top down, allowing the milk to flow from the udder into the teat. It will then close and force the milk from the teat into the milking container.

Milking machines have been in use for half a century and a very extensive development has followed this long use. The majority of those that have been observed, operate on a pulsating vacuum arrangement which largely employs suction to draw out the milk that has accumulated on the phase of the cycle in which no negative pressure is exerted. The majority of these units have the teat cup so arranged that the suction tends to pull the cup down, thus stretching the teat and in many instances causing severe injury to the cows. Even when this may not be serious it often makes the cows so sensitive to the use of this equipment that it becomes difficult to achieve full milking. The cows sometimes become dry sooner than they normally would becaus of this sensitivity and this leads to loss on the part of the dairyman.

With my present equipment I endeavor to very closely simulate the actual functions that are put into operation by a skilled hand milker. In this present equipment the inner liner is made of very pliable material, formerly rubber, but now often made of the new plastics that are generally more sanitary than the materials formerly used. This liner is so proportioned that when external pressure or internal suction occurs pressure is applied at the upper end of the tube close to the udder of the cow and the pressure passes progressively down the teat in the manner of a normal hand milking. It is therefore believed that a distinct advancement has been made with this present invention over those observed in operation in the past.

A principal object of this present invention, therefore, is to provide an outer rigid shell or cylinder as a housing which will have means to open the liner or teat cup properly, allowing the milk to flow into the teat. Then it allows the liner to close around the teat from the top and work gradually downwardly, thus forcing the milk from the teat into the milk receptacle of the milking unit.

A further object of this invention is to provide a teat cup arrangement which will follow the general principles of hand milking and which will in no way injure or excite a cow while being milked, thus overcoming one of the principal disadvantages of the milking machine over careful hand milking.

A further object of this invention is to provide an inner or teat cup made of flexible material which is of a lesser wall thickness near the point of engagement of the teat near the udder and which becomes progressively thicker as it descends to the bottom of the teat cup where it is secured to the suction lines of the milking machine.

A further object of this invention is to provide two rigid telescoping tubes which permit the flexible inner liner to conform to the desirable characteristics obtained in hand milking by moving relative to each other with changes in pressure.

A further object of this invention is to provide a fluid opening to which alternately negative and positive fluid lines may be fed.

Further objects, advantages and capabilities will be apparent from the disclosure in the drawings or may be comprehended or are inherent in the device.

In the drawings:

FIGURE 1 is illustrates in perspective the outer appearance of a teat cup assembly made after the teachings of this present invention.

FIGURE 2 is a vertical cross-sectional view taken along the line 2—2 of FIGURE 1 and on an increased scale.

FIGURE 3 is a transverse sectional view taken along the line 3—3 of FIGURE 2.

FIGURE 4 is a cross-sectional view similar to that of FIGURE 2, but showing the change in form of the inner liner when suction or negative pressure is applied to the outside of the flexible liner.

FIGURE 5 is a cross-sectional view similar to FIGURES 2 and 4, but illustrating the change in the conformation of the inner liner when positive pressure is applied to the outside of the liner and illustrating the initial step in starting the milking operation well up on the teat.

Referring to the drawings, throughout which like reference characters indicate like parts, the numeral 10 designates a rigid enclosing tube of substantially uniform diameter which serves as a housing. Disposed within tube 10 is the flexible liner 12. Liner 12, formerly would have been made of the tasteless rubbers but now we have various types of plastic materials which are neutral and tasteless and which are desirable substitutes for rubber. Liner 12 is secured to tube 10 as illustrated in FIGURES 2, 4 and 5. Here it will be noted that the upper end 12a of liner 12 is the most flexible portion of the teat engaging and pressure applying member which actually achieves the milking operation. At its upper end liner 12 is provided with a disc-like upper portion 14 having a thickened rim indicated at 16 and this rim is engaged by cap 18 and pressed tightly against the upper end 20 of the rigid tube 10 and held in position by the steel band 21. Cap 18 must have a central opening, as 22, sufficiently large to pass therethrough any of the teats for which this equipment may be designed. In viewing FIGURES 2, 4 and 5 it will be noted that the upper end opening of the liner, as indicated at 24, is expandable and must be expanded in order to accept the teat, as shown in dashed lines at 26 in FIGURE 4. At the lower end 12b of liner 12, the thickened portion folded over and enclosing the bottom rim 46 of short tube 40 forms a relatively thick base ring 36 which is attachable to the suction line of the usual milking machine.

*Method of Operation*

This present teat cup is initially employed similarly to the usual cup and is secured to a pulsating vacuum line. The new or improved functioning is achieved by introducing vacuum and positive pressure alternately through nipple 30, tube 28 and openings 32 and 34, opening 34 being greater in area than opening 32.

Referring to FIGURE 2 we have the device shown as at rest and showing the taper of liner 12 and its changes in wall thickness. With various materials this exact shape might not be followed but it is essential to provide that the applied negative and positive pressure will first distort the upper end of liner 12 as indicated in FIGURE 5.

The device can be applied in the usual manner to the teats very easily and without any injury to the cow. In the next cycle of use of the equipment positive pressure is applied through nipple 30 through passageway 32 into the space 50. Now it is believed apparent that if the liner is of uniform material, the thinnest portion of the wall, shown at 52, would be first distorted by the positive pressure. This is accomplished by having the upper end or the thin walled portion of liner 12 applied to the teat so that pressure starts up near the udder and progressively descends, thus forcing the milk that has collected during the former portion of the milking cycle out of the teat. When one cycle of milking has been completed it is then necessary to remove the pressure on the teat so that it can be again filled wtih milk from the udder. Normally however, pressure contact is not lost between the annular restricted portion 54 of liner 12 and the teat. FIGURE 4 shows the teat as being free from liner 12 and is illustrative of the application of the cup to the teat at the beginning of the milking operation.

Referring to FIGURE 5, where the milking pressure is being applied to teat 26 by positive pressure indicated by the arrow 56, it is also supplied through passageway 34 into space 58 in between the short tube 40 and the enclosing tube 10. In this operation O-rings 42 and 44 are employed and they function much as piston rings in retaining the pressure within space 58. The effect is to force the upper O-ring 42 upwardly carrying with it tube 40 thus providing the additional length of flexible tube required in liner 12 because of the compression forming a curved wall shape as indicated in FIGURE 5. The opposite phase of this operation is indicated in FIGURE 4 where suction is being applied, thus moving fluid out of nipple 30 as indicated by arrow 60. Here, the same opening 34 provides means for removing the air contained in chamber 58, thus forcing the short tube 40 out of its greatest extent after the showing of FIGURE 4. The O-rings 42 and 44 serve additionally as stop members to prevent tube 40 from disengaging from tube 10 during the expanding portion of the milking cycle since ring 42 will not slide past ring 44.

In reviewing the cycle of operation it will be apparent that in addition to the pulsating suction line normally supplied by a milking machine and connected at 38, in this present arrangement as illustrated, it is necessary to alternately supply negative pressure through nipple 30 by means not illustrated, as such means are very common, and to then get the compression phase of the cycle as illustrated in FIGURE 5, it is necessary that positive pressure be introduced as is indicated by arrow 56. The end result however of this cycle is to give a very thorough milking after the manner in which this could be achieved by an expert hand milker.

This machine will operate on four inch to eight inch of constant vacuum on the inside cylinder 24 or the liner 12. The teat cup will also operate on fifteen inch vacuum, alternating with eight pounds of pressure in cylinder 58 and ten inch vacuum alternating with five and three-quarter pounds of pressure in cylinder 50. This teat cup will operate at a 60% to 40% ratio at sixty-five pulsations per minute. That is, 60% of the time it will be expelling the milk from the teat and 40% of the time it will be receiving milk from the udder.

It is believed that it will be clearly apparent from the above description and the disclosure in the drawings that the invention comprehends a novel construction of a teat cup for milking machines.

Having thus disclosed my invention, I claim:

1. A teat cup for use with vacuum operated cow milking machines, comprising:
   (a) a flexible teat engaging, tubular pressure applying member;
   (b) said tubular member having a relatively thick base ring portion for engaging the suction line of a milking machine and tapering in thickness upwardly to provide a relatively thin and flexible teat engaging portion;
   (c) a rigid enclosing tube of substantially uniform diameter surrounding the upper portion of said tubular member;
   (d) a cap for said rigid tube coacting with said rigid tube to secure the upper end of said flexible tubular member between them;
   (e) a fluid conducting tube, secured to the outside of said rigid tube, having a tubular nipple portion for engaging a separate fluid hose and a first opening at its upper end communicating with the inside of said rigid tube near its upper end;
   (f) a short rigid tube slidably and telescopically disposed within the lower end of said rigid enclosing tube and having a rimmed lower end to engage a folded end of said flexible teat engaging tubular member and provide a resilient means at the portion where it normally engages the suction line of a milking machine;
   (g) first seal means between the inner lower end of said rigid enclosing tube and said short rigid tube and second seal means between the upper outer end of said short rigid tube and said enclosing tube, said first and second seal means defining a chamber therebetween, and second opening means at the lower end of said fluid conducting tube opening into said chamber for allowing alternating pressure to telescopically move said rigid and short tubes with respect to each other.

2. A teat cup for use with vacuum operated cow milking machines, comprising:
   (a) a flexible teat engaging, tubular pressure applying member;
   (b) said tubular member having a relatively thick base ring portion for engaging the lower end of said teat cup of a milking machine and tapering upwardly to provide a thin wall teat engaging portion and having an upper transversely disposed disc-like portion with a thickened peripheral rim;
   (c) a rigid enclosing tube of substantially uniform diameter surrounding the upper portion of said tubular member;
   (d) a cap for said rigid tube coacting with said rigid tube to secure the upper end of said flexible tubular member between them;
   (e) a fluid conducting tube, secured to the outside of said rigid tube, having a tubular nipple portion for engaging a separate fluid hose and an opening at its upper end communicating with the inside of said rigid tube near its upper end;
   (f) a short rigid tube slidably and telescopically disposed within the lower end of said rigid enclosing tube and having a rimmed lower end to engage a folded end of said flexible teat engaging tubular member and provide a resilient means at the portion where it normally engages the suction line of a milking machine;
   (g) first seal means between the inner lower end of said enclosing tube and said short tube and second seal means between the upper outer end of said short tube and said enclosing tube, said first and second seal means defining a chamber therebetween, and second opening means at the lower end of said fluid conducting tube opening into said chamber for allowing alternating positive and negative pressure to telescopically move said enclosing and short tubes with respect to each other.

3. A teat cup for use with vacuum operated cow milking machines, comprising:
   (a) a flexible teat engaging, tubular pressure applying member;
   (b) said tubular member having a relatively thick base ring portion for engaging the suction line of a milking machine and tapering in thickness upwardly to provide a relatively thin and flexible teat engaging portion;
   (c) a rigid enclosing tube of substantially uniform diameter surrounding the uppor portion of said tubular member;
   (d) a cap for said rigid tube coacting with said rigid tube to secure the upper end of said flexible tubular member between them;
   (e) a fluid conducting tube, secured to the outside of said rigid tube, having a tubular nipple portion for engaging a separate fluid hose and an opening at its upper end and a second opening of increased size at its lower end both communicating with the inside of said rigid tube;

(f) a short rigid tube slidably and telescopically disposed within the lower end of said rigid enclosing tube and having a lower rimmed end to engage a folded end of said flexible teat engaging tubular member and provide a resilient means at the portion where it normally engages the suction line of a milking machine;

(g) spaced apart annular sealing means located between said rigid tube and said short tube to define a chamber therebetween, said second opening communicating with said chamber to permit alternating negative and positive pressure to telescopically move said rigid and short tubes.

4. A teat cup for use with vacuum operated cow milking machines, comprising:

(a) a flexible teat engaging, tubular pressure applying member;

(j) said flexible member being disposed within and secured at its ends to a pair of telescoping rigid enclosing tubes, a relatively short tube slidably disposed within the lower end of a substantially uniform cylindrical enclosing tube;

(k) the upper portion of said flexible member being secured by means of a cap and band to said cylindrical enclosing tube;

(l) the lower portion of said flexible member being folded over and secured to the lower rim of said short tube;

(m) said flexible member having relatively thin wall thickness at its upper end and progressively thicker walls toward its lower end;

(n) a fluid conducting tube, secured to the outside of said cylindrical enclosing tube, having a tubular nipple portion for engaging a separate fluid hose and an opening at its upper end and a second opening of increased size at its lower end, both openings communicating with the inside of said cylindrical tube;

(o) a pair of spaced apart annular sealing means disposed between said enclosing tube and said short tube defining a chamber therebetween, said second opening communicating with said chamber to permit alternating negative and positive pressure to telescopically move said enclosing and short tubes with respect to each other.

5. A teat cup for use with vacuum operated cow milking machines, comprising:

(a) a flexible teat engaging, tubular pressure applying member;

(p) a telescoping pair of rigid tubes enclosing said flexible member, a relatively short tube slidably and telescopically disposed within the lower end of a substantially uniform cylindrical enclosing tube;

(k) the upper portion of said flexible member being secured by means of a cap and band to said cylindrical enclosing tube;

(l) the lower portion of said flexible member being folded over and secured to the rim of said short tube;

(m) said flexible member having relatively thin wall thickness at its upper end and progressively thicker walls toward its lower end;

(n) a fluid conducting tube, secured to the outside of said cylindrical enclosing tube, having a tubular nipple portion for engaging a separate fluid hose and an opening at its upper end and a second opening of increased size at its lower end, both openings communicating with the inside of said cylindrical tube;

(q) a pair of spaced apart annular sealing means disposed between said enclosing tube and said short tube, said sealing means defining a chamber therebetween, said second opening communicating with said chamber to permit alternating positive and negative pressure in said fluid conducting tube to telescopically move said enclosing and short tubes with respect to each other.

References Cited in the file of this patent

UNITED STATES PATENTS

| | | |
|---|---|---|
| 1,201,808 | Dinesen | Oct. 17, 1916 |
| 1,971,467 | Scott | Aug. 28, 1934 |
| 2,073,737 | Ellison | Mar. 16, 1937 |
| 2,320,229 | Frost | May 25, 1943 |
| 2,853,971 | Bajema | Sept. 30, 1958 |

FOREIGN PATENTS

| | | |
|---|---|---|
| 23,802 | Australia | June 2, 1936 |
| 69,251 | Netherlands | Jan. 15, 1952 |